United States Patent

Barstow

[15] 3,667,051

[45] May 30, 1972

[54] MULTI-CHANNEL FREQUENCY MONITOR

[72] Inventor: Glidden J. Barstow, San Diego, Calif.
[73] Assignee: The United States of America as represented by the Secretary of the Navy
[22] Filed: Feb. 22, 1971
[21] Appl. No.: 117,573

[52] U.S. Cl. ....................325/363, 178/69 M, 324/79 R, 324/80
[51] Int. Cl. ............................................H04l 27/16
[58] Field of Search....................325/320, 363, 453, 455, 30, 325/134; 324/77 B, 77 D, 77 E, 78 R, 78 F, 79 R, 80; 178/69 R, 69 M, 66 R

[56] References Cited

UNITED STATES PATENTS

| 2,613,271 | 10/1952 | Trevor | 324/78 |
| 2,766,375 | 10/1956 | Couillard | 325/455 |
| 3,187,097 | 6/1965 | Feldman | 178/69 |
| 2,967,998 | 1/1961 | Hurvitz | 325/363 |
| 2,640,106 | 5/1953 | Wilson et al. | 178/69 |

Primary Examiner—Robert L. Richardson
Assistant Examiner—Peter M. Pecori
Attorney—R. S. Sciascia, G. J. Rubens and J. W. McLaren

[57] ABSTRACT

A frequency monitor visually displays the operative accuracy of any selected channel from a source of multi-channel signals. The accuracy of operation of upper and lower frequency sidebands defining each selected channel is visually displayed on vibrating reed meters which are preferably coded visually in color and/or shape so as to render the display immediately indicative of whether the selected channel is functioning within predetermined tolerances. Such a visual display renders the desired indication of the degree of operative accuracy without the requirement for specially trained personnel, interpretative decisions, or the manipulation of relatively complex instrumentation such as a frequency analyzer.

6 Claims, 3 Drawing Figures

INVENTOR.
GLIDDEN J. BARSTOW

BY

ATTORNEYS

MULTI-CHANNEL FREQUENCY MONITOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Included in the communications facilities of a typical naval vessel there are usually a number of receivers aboard ship as well as transmitters. Such receivers and transmitters may be connected an an AN/UCC-1(V) telegraph terminal which both sends and receives multiplexed signals for each receiver and transmitter aboard ship. Such equipment connected to the telegraph terminal may constitute a source of multi-channel signals and it is required that the multiplexed sideband signals received or sent from the telegraph terminal be maintained within relatively stringent preestablished frequency tolerances in order for such telegraph terminal equipment to operate properly. Each such receiver or transmitter is a source of multi-channel signals, and each channel within each such source of signals must be verified for operation within frequency tolerance as well as to determine which channels are in use at a particular time. A conventional method of verifying operations within frequency tolerance is to employ spectrum analysis such as may be carried out with an appropriate frequency analyzer. This type of instrumentation, however, is costly, complicated, involves relatively complex maintenance procedures and in addition requires comparatively highly skilled and extensively trained operators. Accordingly, it is desired that an inexpensive, easily maintained, and reliable frequency monitor be devised in a form which is readily understood through uncomplicated visual observance, thus eliminating the need for subjective interpretative decisions insofar as possible, and without the requirement of high skill and extensive training for the operator.

SUMMARY OF THE INVENTION

The present invention comprises a frequency monitor which is capable of selecting any channel from one of a number of multi-channel sources of signals and visually displaying the operative accuracy of predetermined upper and lower frequency sidebands which define each channel.

On a naval vessel there may be a number of sources and receptors of multi-channel signals, such as radio receivers and tone terminal equipments. These multi-channel signals are multiplexed audio frequency tone signals which are coded in terms of an upper and lower tone signal representative of a "mark" tone frequency and a "space" tone frequency. Such keyed telegraph signals are composed of a carrier and sidebands. The carrier or center frequencies may be of any number from $F_1 \ldots F_n$, while upper and lower sideband frequencies may similarly be $f_1', f_1'' \ldots f_n', f_n''$, respectively. The upper and lower sideband signals customarily are displaced in frequency from the center or carrier frequency by the same amount in each channel.

The present invention contemplates a plurality of filters which are connected to receive the multi-channel signals; each filter is designed to be responsive for passing only those frequencies within the predetermined frequency sidebands of one particular channel with which it is identified and associated. A signal generator is provided for developing a plurality of signals each of which signal has a frequency differing from the respective upper and lower sideband frequencies of an associated channel by common upper and lower intermediate frequencies. A mixer circuit is adapted to accept first and second input signals and produce output signals as a function of frequency differences between the inputs. A selector means, such as an appropriate multi-connector switch, for example, is arranged to connect the output of any selected filter to the mixer together with the output of the signal generator associated with the particular channel represented by the selected filter.

Thus, the mixer hereodynes the upper and lower sideband signals with the signal output of the signal generator which is characterized as having a frequency differing from the upper and lower sideband frequencies of an associated selected channel by common upper and lower sideband intermediate frequencies. Accordingly, regardless of which channel is selected, the operation of the selector means will function to connect to the mixer, those signals having frequencies which are so related as to produce common upper and lower sideband intermediate frequencies for all channels.

The outputs of the mixer circuit may be appropriately filtered in a bandpass filter, for example, connected to a driver amplifier, and thence to two separate power amplifiers, each of which actuates a vibrating reed meter to visually indicate the operative frequencies in terms of predetermined and fixed intermediate sideband frequencies.

The vibrating reed meters in a typical embodiment of the present invention may comprise 21 reeds, the center one of which indicates the lower sideband intermediate frequency, for example, with the five reeds on either side of the center reed visually indicating operation within 1 Hz increments, both higher and lower than the lower intermediate sideband frequency. The five reeds extending on either side of the center 11 reeds will indicate 1 Hz increments which are out of the preestablished tolerance of frequency variation. The same arrangement may be provided for the upper intermediate sideband frequency vibrating reed meter. Both the vibrating reed meters preferably have the visually exposed portion of the vibrating reed coded in a readily recognizable manner such as by shape and/or color to quickly and readily indicate operation within frequency tolerance or alternatively to indicate that operation of the selected channel is not within the permitted tolerance limits.

In a preferred embodiment of the present invention the center eleven of 21 vibrating reeds were coded white so that their up and down excursions would be readily discernible as being within permitted tolerance, while the two groups of five reeds on either extreme right and left of the meter were painted in a bright red to make their up and down excursions readily recognizable as an indication that the selected channel was operating outside permitted frequency deviation.

It will be obvious to those skilled in the art that the concept of the present invention in employing vibrating reed meters for visual display in addition to ascertaining operation of a selected channel within frequency tolerance also provides a fast, reliable, and efficient method of ascertaining which channels within multi-channel equipments are being used at a particular time. This, of course, will be clearly evident from the fact that any given selected channel causes one or several of the vibrating reed indicators to deflect in vibrating excursions, showing use of the channel or the alternative indication that none of the vibrating reed visual indicators are actuated, indicating that the selected channel is not in use at that particular time.

Accordingly, it is a primary object of the present invention to provide a relatively inexpensive, reliable, and readily recognizable visual indication of the operative accuracy within frequency tolerance limits of a channel selected from multi-channel signals.

It is another most important object of the present invention to enable such a frequency monitor to provide reliable information without requiring extensive training of operator personnel.

An ancillary object of the present invention is to provide such a frequency monitor which virtually eliminates the requirement for interpretative decisions on the part of operator personnel.

Yet another most important object of the present invention is to provide a frequency monitor system which is responsive to redundantly coherent portions of coded signals to inertially sustain visually discernible reed vibrations during intermittent "off" portions of the coded signal's cycle.

Another important object of the present invention is to provide such a frequency monitor in which any one of numerous signal sources may be selectively examined and any of a plurality of channels within each such signal source verified for operation within frequency tolerance.

A further object of the present invention is to provide such a frequency monitor which is also capable of instantaneously indicating whether or not any one of more of selectively determined channels within a multi-channel operation is in use at a particular time.

These and other features, objects, and advantages of the present invention will be better appreciated from an understanding of a preferred embodiment of the new frequency monitor as disclosed in the following description and as illustrated in the accompanying drawings.

DESCRIPTION OF THE PREFERRED EMBODIMENT

Figures 1, 2, 3:
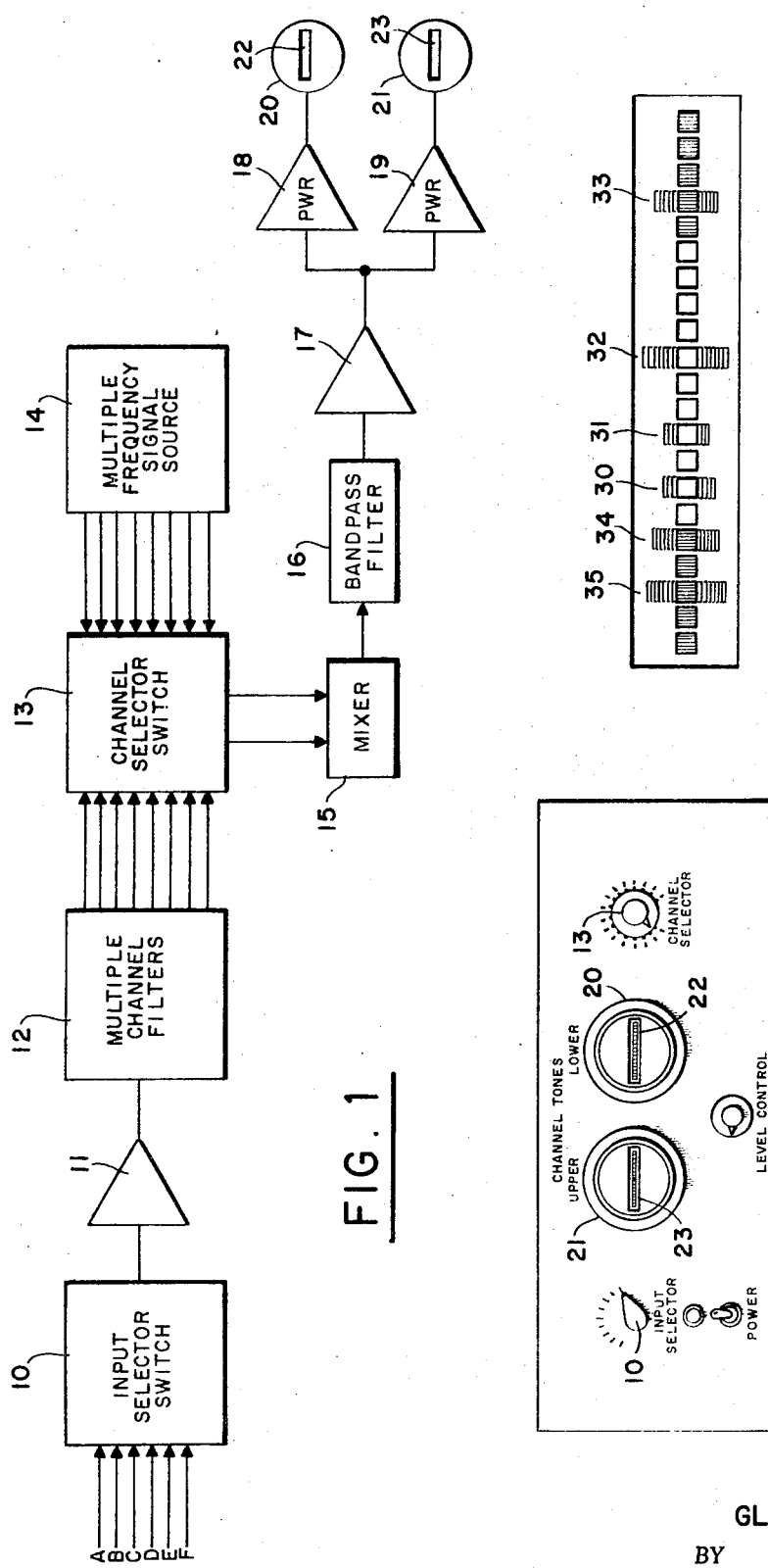
FIG. 1 is a schematic block diagram of a preferred embodiment of the present invention.
FIG. 2 is an illustration of the visual indication presented by a preferred embodiment of the present invention.
FIG. 3 is an enlarged illustration of the visual presentation of the vibrating reed meter portion of an equipment embodying the concept of the present invention.

In FIG. 1 there is illustrated a preferred embodiment of the present invention. The concept of the present invention contemplates that it may be desirable to accept a selected one of numerous sources of signals, each of which comprises, in and of itself, a multi-channel signal within which a particular channel may be selected for verification of operation within frequency tolerance. Accordingly, the multiple inputs indicated by A through F in FIG. 1 are shown as input signals to an input selector switch 10. The input selector switch 10 performs the function of allowing the operator to select any one of a number of receivers or transmitters which may be linked with an AN/UCC-1(V) telegraph terminal, for example, in a typical installation.

An amplifier 11 performs the function of amplifying the selected source of signals and feeding those signals to multiple channel filters as indicated at 12. The multiple channel filters are characterized by being responsive for passing only those frequencies within the predetermined frequency sidebands of one channel of a plurality of channels. Thus, the filters 12, all of which receive the same source of signals as selected by input selector 10, provide multiple outputs equal in number to the number of channels involved and to the number of filters, one of which is associated with each channel.

The output of the multiple channel filters 12 are connected to a channel selector switch 13. The channel selector switch 13 also receives a like number of frequencies from a multiple frequency signal source 14, each frequency being associated with a particular channel and being characterized in that it differs from the upper and lower sideband frequencies of its associated channel by common upper and lower sideband intermediate frequencies.

Upon the actuation of channel selector switch 13 the signal from the selected channel is connected to a mixer 15 together with the signal from the signal source 14 which is associated with that particular selected channel. The mixer 15 thus operates in the manner of a heterodyning element, producing the common upper and lower sideband intermediate frequencies mentioned previously. These common upper and lower sideband intermediate frequencies, which are the same for each selected channel because of the nature of the heterodyning operating and the related associated frequencies produced by the signal source 14 are connected as an input to a band-pass filter 16 which may be employed in the present invention to eliminate extraneous frequencies beyond the predetermined limits of frequency tolerance.

The filter output of the bandpass filter 16 may be fed as the input to a driver amplifier 17 which in turn, drives two power amplifiers 18 and 19 with the same signals. The outputs of the power amplifiers 18 and 19 are connected as the inputs to vibrating reed meters 20 and 21 for visually representing the lower and upper sideband operations, respectively. The windows 22 and 23 of the respective vibrating reed meters 20 and 21 may present vibrating reeds which are visually coded in shape or color, or both, to immediately and readily present visual indication of operation either within or beyond the predetermined frequency tolerance limits.

Thus, it may be seen that the present invention provides a relatively simple, inexpensive, and highly reliable equipment for selecting any of a number of sources of signals such as A, B, C, D, E, F, indicated as inputs to the input selector switch means for selecting any channel of multiple channels contained within each of the selectably sources of signals A, B, C, D, E, or F, and then determining the operation of upper and lower sideband signals within frequency tolerances for any selected channel of the plurality of channels. Moreover, the visual presentation is such that it requires no frequency scanning, spectrum analysis, interpretative decisions, nor calculations such as may be necessary if the relatively complex method and means of spectral analysis by a frequency analyzer were employed.

In accordance with the concept of the present invention, the operator has merely to make two straightforward and simple selections for an immediate visual indication of the operation within or beyond frequency tolerance limits of two sideband signals defining a particular channel selected from a multiplicity of channels and/or to determine whether or not any such selected channel is being employed to transmit or receive at that particular time.

For example, upon ascertaining that a particular channel of a selected source of input signals is operating out of tolerance, the operator may switch to several different channels, all within the same source of a selected input signal, and if all channels are similarly operative out of tolerance it may indicate that the equipment which provides the source of signal input to the input selector switch 10 is either mistuned, drifting, or has a defective component which is affecting the proper operation throughout all channels. Such indications of malfunctions and trouble sources can be ascertained by a relatively untrained operator employing an equipment embodying the concepts of the present invention. The determination of similar malfunctions, or sources of trouble could literally not only involve hours of painstaking, interpretative, spectral analysis by prior art methods and equipments, but would also require relatively highly trained, skilled personnel and would be subject to a much greater likelihood of human error.

FIG. 2 is an illustration of the visual presentation provided by a preferred embodiment of the present invention. In FIG. 2 like components bear the same numerical designations as in the schematic block diagram of FIG. 1. The switch 10 may be employed to select one of a plurality of possible inputs, while the switch 13 makes provision for selection of a particular channel within any one of the number of multi-channel sources of signals as determined by the actuation of the input selector switch 10. Accordingly, in the particular equipment illustrated in FIG. 2, any one of 16 different channels may be selected through the actuation of the channel selector switch 13. As the result of such selection, the visual presentation is seen at the windows 22 and 23 of the lower and upper sideband frequency vibrating reed meters 20 and 21. The meters 20 and 21 in the illustrated embodiment have 21 vibrating reeds, the center one of each representing operation precisely on the designed and desired sideband frequency. Each of five vibrating reeds on either side of the center reed represemt deviation by 1 Hz from the designed sideband frequency. The center 11 reeds are coded with a white face to indicate that operation is within tolerance in this span of indicated frequencies. Therefore, if reeds only within the center 11 span of reeds vibrate, indicating operation within that frequency spectrum, it is immediately determined that operation of the sideband frequency involved is within tolerance and acceptable.

The extreme five reeds on either side of the middle 11 reeds are coded with a red color and each reed similarly indicates an additional 1 Hz deviation from the center or design frequency. When the red coded reeds vibrate, there is an immediate indication of operation outside the limits of design tolerance for that particular sideband frequency of the selected channel.

FIG. 3 is an enlarged illustration of the window and the individual reeds of a typical vibrating reed meter such as may be employed in a preferred embodiment of the present invention. The particular vibrating reed meter illustrated has 21 reeds, the center eleven of which are coded with white color to indicate operation within a predetermined design tolerance, while the extreme five end reeds are coded with the color red to indicate operation beyond the design tolerance. Accordingly, if the reeds 30, 31, and 32 are the only actuated vibrating reeds, the immediate indication is that the sideband of the selected channel as represented by the visual presentation is in operation and also that it is operating within the design tolerance. Since the center reed of the middle 11 reeds represents the center frequency of the particular sideband from the selected channel, vibration of the reed 32 indicates that operation is taking place at a frequency 1 Hz removed from the center frequency, while vibration of the reeds 31 and 30 indicates operation at frequencies 2 and 4 Hz removed from the center sideband frequency, respectively.

If, however, the operator observes that the reed 33 is vibrating, it is immediately ascertained that the selected channel is operating out of its design frequency tolerance. Similarly, if reeds 34 and/or 35 are observed to vibrate, there is a like indication that the selected channel is operating out of its design frequency. There are, of course, two of the type of vibrating reed meters illustrated in FIG. 3 in each equipment as is illustrated in FIG. 2, one of the vibrating reed meters indicating an upper channel tone, while the other indicates a lower channel tone in the multiplexed sideband operation contemplated by the present invention.

One typical embodiment of the present invention was employed to monitor the operation of telegraph multiplex audio signals which were sent to and received from an AN/UCC-1(V) telegraph terminal operated with teletype equipment. In the operation of the embodiment of the present invention used with an AN/UCC-1(V) equipment the multiple reeds were generally observed to vibrate in groups of several in which the center reed of the group exhibited greater excursions and the adjacent reeds lesser excursions in proportion to displacement from the center of the group.

The multiple audio signals of the various channels used with that particular embodiment had upper and lower tones representative of a "space" and "mark" code which was determinative of the intelligence being transmitted and received and caused a teletype machine to type out a received message, for example. Successive "space" and "mark" code words were begun by distinctive "start" indications which comprised redundantly coherent portions of signals in each sequence of coded intelligence. The inertial effect of these redundantly coherent portions of signals sustaining a continuation of visually discernible reed vibration during short "off" portions of the coded signal's cycle obviating the possibility of damping out the desired visual presentation.

The two tones in the described system were represented by the two sideband frequencies of 16 different channels, the channels varying in center frequency from 425 Hz to 2,975 Hz in increments of 170 Hz. The sideband signals differed by 42 ½ Hz from the center frequency of each channel, one of the sidebands 42 ½ 42½ Hz lower in frequency than the center frequency of its associated channel, while the other sideband was 42 ½ Hz higher in frequency than the center frequency of its associated channel. Thus, for example, if the center frequency of a particular channel were 765 Hz, the upper sideband tone would be 807.5 Hz, while the lower sideband tone would be 722.5 Hz.

In this particular equipment a multiple frequency source was employed which developed all the necessary frequencies from a single 1 MHz source. The single 1 MHz source was divided and added to provide all the required frequencies in the system. For example, the 1 MHz source was divided by two to provide 500 KHz, divided by five to provide 100 KHz, and again divided by five to provide a 20 KHz frequency.

The 20 KHz signal was then divided by five again and also connected in parallel to another divider which divided by two, the respective outputs being 4 KHz and 10 KHz. Each of these signals was again divided by two separately, to provide 2 KHz and 5 KHz which were then added to provide a 7 KHz signal. The 7 KHz was added to the signal tapped from the previously developed 10 KHz and added to provide 17 KHz outputs which were divided by five and two respectively to develop 3.4 KHz and 8.5 KHz. The 3.4 KHz was twice divided by two again to provide 850 Hz which was divided by 10 to produce a 85 Hz signal, which it will be recalled, was the separation between the upper and lower sideband tones of the system. The 850 Hz signal was also divided by five to generate a 170 Hz signal, the harmonic separation between each of the adjacent 16 channels employed in the system. By multiplying by a suitable integral number, the 170 Hz signal could be converted to the center frequency of any of the 16 channels which it will be recalled were separated by 170 Hz between adjacent channels. Accordingly, by selecting the desired frequency for connection through the channel selector switch, the correct heterodyning frequency could be related to its particular associated channel and the signal from that associated channel and the correct heterodyning frequency be connected as the two inputs to the mixer through the channel selector switch as illustrated in FIG. 1 and previously described. By employing but a single basic signal source such as the 1 MHz source employed in a typical embodiment of the present invention, a high degree of frequency stability of all the signals developed may be achieved inexpensively and relatively simply to further enhance the operation contemplated by the present invention.

Obviously many modifications and variations of the present invention are possible in the light of the above teachings. It is therefore to be understood that within the scope of the appended claims the invention may be practiced otherwise than as specifically described.

What is claimed is:

1. A frequency monitor for selecting any channel from multi-channel signals and visually displaying the operative accuracy of predetermined upper and lower frequency sidebands defining each channel for coded signals having redundantly coherent portions comprising:

a plurality of filters connected to receive said multi-channel signals, each filter being responsive for passing only those frequencies within the predetermined frequency sidebands of one channel;

a signal generator for developing a plurality of signals, each of said signals having a frequency which differs from associated channel upper and lower sideband frequencies by common upper and lower sideband intermediate frequencies;

a mixer circuit for accepting first and second input signals and producing output signals as a function of the frequency differences between said inputs;

selector means for connecting the output of any of said filters to said mixer as a first input signal representative of a selected channel, said means being operative for connecting that signal from said signal generator which is associated with the selected channel as a second input to said mixer;

first and second vibrating reed meters operative in the ranges of said upper and lower intermediate frequencies and responsive to the redundantly coherent portions of said coded signals for sustaining a visually discernible display; and means connecting the output signals of said mixer circuit to said first and second vibrating reed meters.

2. A frequency monitor as claimed in claim 1 and including switch means selectively connectable to any of a plurality of multi-channel signal sources for providing the input signals to said filters.

3. A frequency monitor as claimed in claim 1 wherein the vibrating reeds of said vibrating reed meters are visually coded to indicate the limits of tolerance in the operative accuracy of the signals being monitored.

4. A frequency monitor as claimed in claim 3 wherein said vibrating reeds are color coded to indicate said limits of tolerance.

5. A frequency monitor as claimed in claim 1 wherein said signal generator develops a plurality of signals having different frequencies from a single signal source.

6. A frequency monitor as claimed in claim 5 wherein said signal generator is operative to divide and mix signals derived from said single signal source for developing a plurality of signals having different frequencies.

* * * * *